US008661236B2

(12) United States Patent
Itoh (10) Patent No.: US 8,661,236 B2
(45) Date of Patent: Feb. 25, 2014

(54) PARTIAL INITIALIZATION OF DIVIDED PROGRAMS IN RESPONSE TO PRE-BOOT AND POST-BOOT ACTIVATION EVENTS TO RAPIDLY BOOT A COMPUTER SYSTEM

(75) Inventor: Hiroshi Itoh, Sagamihara (JP)

(73) Assignee: Lenovo (Singapore) Pte Ltd, Singapore (SG)

( * ) Notice: Subject to any disclaimer, the term of this patent is extended or adjusted under 35 U.S.C. 154(b) by 281 days.

(21) Appl. No.: 13/248,063

(22) Filed: Sep. 29, 2011

(65) Prior Publication Data
US 2012/0117368 A1    May 10, 2012

(30) Foreign Application Priority Data
Nov. 4, 2010   (JP) .................................. 2010-246971

(51) Int. Cl.
*G06F 9/445*          (2006.01)
(52) U.S. Cl.
USPC ................................................................ 713/2
(58) Field of Classification Search
USPC ........................................................ 713/2, 1
See application file for complete search history.

(56) References Cited

U.S. PATENT DOCUMENTS

| 5,867,702 A * | 2/1999 | Lee ..................................... 713/1 |
| 5,867,703 A * | 2/1999 | Miller et al. ....................... 713/1 |
| 6,931,558 B1 * | 8/2005 | Jeffe et al. ....................... 713/340 |
| 7,664,939 B2 * | 2/2010 | Endo et al. ...................... 712/220 |
| 8,370,613 B1 * | 2/2013 | Manadhata et al. ............... 713/2 |
| 8,386,738 B1 * | 2/2013 | Sun ................................. 711/167 |
| 2007/0113067 A1 * | 5/2007 | Oh et al. ............................ 713/2 |
| 2007/0136536 A1 * | 6/2007 | Byun et al. ..................... 711/149 |
| 2011/0040959 A1 * | 2/2011 | Choi et al. ......................... 713/2 |
| 2012/0005687 A1 * | 1/2012 | Ito ................................. 718/107 |
| 2012/0216027 A1 * | 8/2012 | Schneider ......................... 713/2 |

FOREIGN PATENT DOCUMENTS

| JP | 11-265289   | 9/1999 |
| JP | 200299417   | 4/2002 |
| JP | 2006268377  | 10/2006 |
| JP | 2007299404  | 11/2007 |
| JP | 2009217711  | 9/2009 |
| JP | 2009251728  | 10/2009 |
| JP | 2010-211596 | 9/2010 |
| JP | 2010-217945 | 9/2010 |

* cited by examiner

*Primary Examiner* — Chun Cao
*Assistant Examiner* — Danny Chan
(74) *Attorney, Agent, or Firm* — Antony P. Ng; Yudell Isidore Ng Russell PLLC (57) ABSTRACT

A method for booting up a computer is disclosed. Initially, a memory image of a boot program is stored in a main memory of a computer. The memory image includes a first initialization code and a second initialization code. During the booting process of the computer, first initialization code is executed. In response to the completion of the execution of the first initialization code, the boot program is shifted to an idle state. In response to an activation event, the second initialization code is executed.

16 Claims, 5 Drawing Sheets

PARTIAL INITIALIZATION OF DIVIDED PROGRAMS IN RESPONSE TO PRE-BOOT AND POST-BOOT ACTIVATION EVENTS TO RAPIDLY BOOT A COMPUTER SYSTEM

PRIORITY CLAIM

The present application claims benefit of priority under 35 U.S.C. §§120, 365 to the previously filed Japanese Patent Application No. JP2010-246971 entitled, "METHOD FOR BOOTING COMPUTER IN A SHORT TIME AND COMPUTER" with a priority date of Nov. 4, 2010, which is incorporated by reference herein.

BACKGROUND

1. Technical Field

The present invention relates to computer boot time in general, and in particular to a method for booting up a computer in a relative short time.

2. Description of Related Art

When a computer is switched on, the computer starts a boot process (also known as bootstrapping or boot) to automatically load a predetermined boot program from a boot disk into a main memory and then executes the boot program. After a series of boot files has been loaded and executed, the computer is then ready for a user to execute any application program on the computer.

When a computer is brand new from the manufacturer, the boot process of the computer can be completed in a relatively short time because the sizes of the boot programs are relatively small. However, after the computer has been in use for many years, during which the user might have installed various application programs therein, these application programs would be incorporated into the boot files and the auto-run files, typically without the knowledge of the user. As a result, the time to complete the boot process is lengthened.

One prior art solution for speeding up the boot time of a computer system is to numerically limit task objects (static generation) generated during initialization of an operating system (OS). More specifically, while a task object with a relatively short initial access time between boot completion and access is statically generated, a task object with an initial access time longer than a certain time is generated by calling a specific system call in an application after boot completion (dynamic generation). Another prior art solution is to shorten a boot time of an OS by running applications to be activated with the OS at different timings on the basis of various conditions. In one example, after completion of the boot of the OS, each application is auto-run at a different timing.

For instance, an application called from another application for running and a certain type of service program of an OS are required to be activated prior to the running of a caller application. In this way, in the case of a program with an execution order depending on another program, the activation order cannot be changed freely. Therefore, the above-mentioned two prior art solutions have to be modified to make a confirmation whether the activation order of a program depends on another program or not or to keep the dependence of the activation order, and so there is a restriction on programs that can be activated after boot completion. Such a restriction arises every time a special program tries to control execution timing of other programs during booting.

A boot program includes a body code playing the original function as well as an initialization code initializing the body code. The initialization code runs only at the beginning of the running the program to configure information of a registry and other databases at the body code. While the body code runs, the registry tends to accumulate unnecessary information that should be deleted and gradually become bloated. If the initialization code configures the body code in accordance with the information of the bloated registry, a boot time becomes further longer because of redundant consumption of hardware resources such as a disk drive and a processor.

A tool known as registry cleaner can be utilized to delete unnecessary information from a registry. The registry cleaner can delete information from a registry when the information can be evidently regarded as deletable with even a program other than a target program. For instance, information such as a shortcut without a link and a temporary cache file can be deleted. When the registry cleaner deletes information in the registry without consideration given to the situation of a target program, the operation of the program will be unstable. Further, whether or not to execute a registry cleaner depends on a user's operation, thus, the registry cleaner is not always executed for shortening a boot time.

Consequently, it would be desirable to provide an improved method for booting up a computer in a relative short time.

SUMMARY

In accordance with a preferred embodiment of the present invention, a memory image of a boot program is initially stored in a main memory of a computer. The memory image includes a first initialization code and a second initialization code. During the booting process of the computer, first initialization code is executed. In response to the completion of the execution of the first initialization code, the boot program is shifted to an idle state. In response to an activation event, the second initialization code is executed.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

[Configuration of a Computer System]

Figure 1:
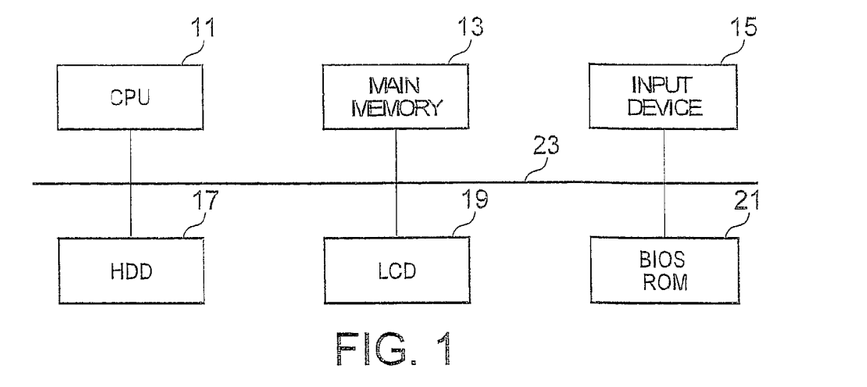
FIG. 1 is a block diagram of a computer according to the present embodiment.

FIG. 1 is a block diagram of a computer 10 according to the present embodiment. The computer 10 includes a CPU 11, a main memory 13, an input device 15, a hard disk drive (HDD) 17, a liquid crystal display (LCD) 19, a BIOS_ROM 21 and the like, each connected with a bus 23. The input device 15 may be a mouse or a keyboard. The LCD 19 displays a window of an application. The HDD 17 stores a boot program or a non-boot program. Since functions of these hardware devices relating to the present embodiment are well-known and the present invention can be embodied independent of the hardware, the descriptions thereof have been omitted.

DEFINITIONS

Definitions of terms used in the present specification are as follows. A boot program refers to a ready program, which may be called a module, a code or a file, or a DLL file automatically loaded in the main memory 13 for running after a computer is switched on. To load a program refers to the operation where a linker links an object code read from a disk drive with another object code and a library to generate a memory image and such a memory image is stored in a main memory. Such loading of a program does not include the processing to run the program. A run state of a program is a state where, in an operating system (OS) performing preemptive multitasking, a process to run the program transits between a run state and a ready state under the control of a task scheduler of the OS.

An idle state of a program refers to a state where a process to run the program is out of a run state because the process is called by a specific Application Programming Interface (API) function and the process transits to a suspend state or a wait state. An OS does not allocate a time slice of the CPU 11 to a process in a suspend state or in a wait state, but can resume the process and make the process transit to a run state while monitoring a window message generated by an event in response to an input through a keyboard or a mouse or an interprocess communication when calling a specific API function to call the process generated by an OS or another program.

A not-run state of a program refers to a state where a process to load the program is not yet created or although the program is loaded, a process to run the program is not yet created. With the exception of a special program, a program in a not-run state cannot be called from another program and activated, but a program in an idle state can be called from another program and run.

Activation completion of a program refers to a state where initialization of the program is totally completed and a body code to implement the original function is about to be run or a state where initialization is totally completed and the program shifts to an idle state. When a program has a window as a user interface, timing when the window is displayed may be called activation completion of the program.

Activation completion of a program in the present embodiment further includes a state where a part of an initialization code of the program runs so that initialization is partially completed and a body code with the original function corresponding to a part of where initialization is completed runs or a state where initialization is partially completed and the program shifts to an idle state. Such a state where activation is not completed thoroughly but initialization of a part of the body code is completed is called a partial activation completion. Dependence of programs refer to a state where a program and another program have a relationship for the activation order such that when a program is called to run another program, the former program is required to be activated prior to the latter program so as to provide a service.

Boot completion refers to a state where a CPU usage of the computer as a whole is kept at a predetermined value or lower during a predetermined time period. The CPU usage Y of the computer as a whole can be calculated by the following expression with a predetermined program of an OS:

$$Y=(1-(Ui+Ki)/Et)\times 100\%,$$

where Ui denotes a user mode time of an idle process, Ki denotes a kernel mode time of the idle process, and Et denotes an elapsed time.

Herein, boot completion has the same meaning as activation completion of a computer. On the basis of the aforementioned definitions, activation completion of all of the boot programs means to boot completion of the computer. However, timing for activation completion of individual boot programs does not agree with timing for boot completion of a computer, and activation of a part of the boot programs is completed prior to boot completion.

[Software Configuration]

Figure 2:
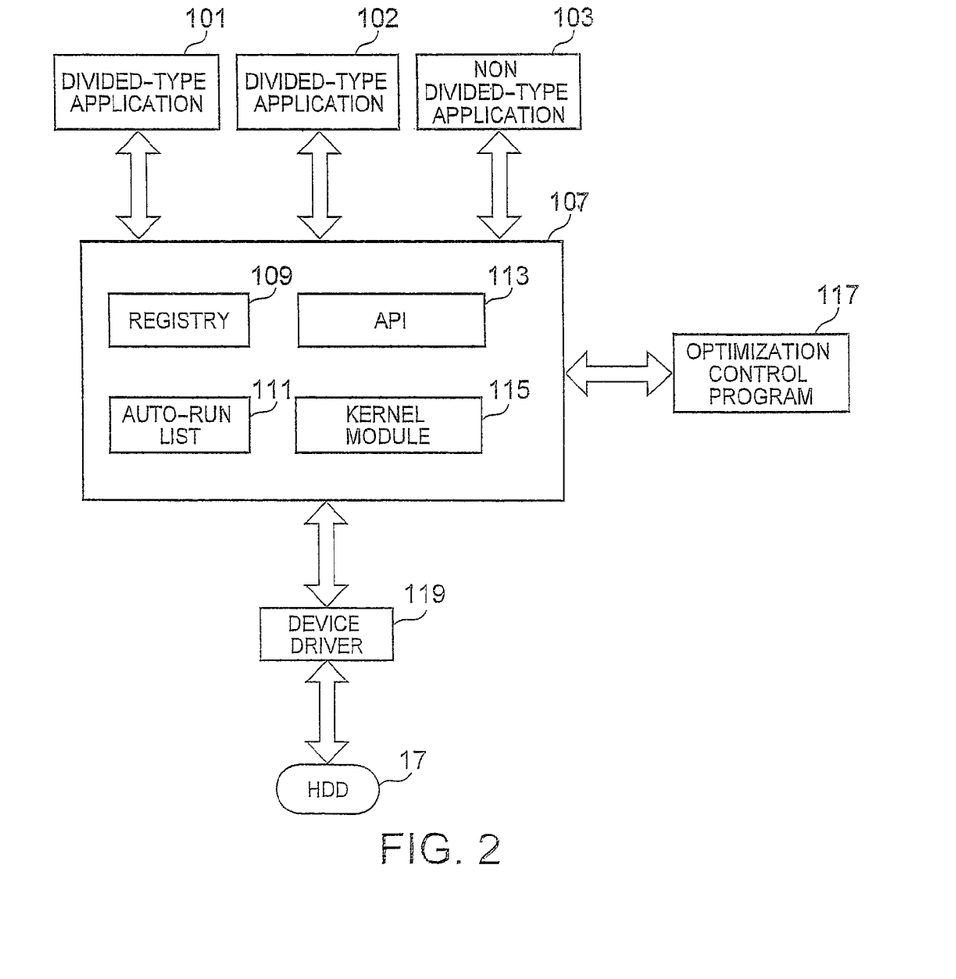
FIG. 2 is a block diagram of the software configuration implemented in the computer from FIG. 1.

FIG. 2 is a block diagram of the software configuration implemented in the computer 10. Software according to the present embodiment includes divided-type applications 101 and 102, a non-divided-type application 103, an OS 107, an optimization control program 117 and a device driver 119. The divided-type applications 101 and 102 and the non divided-type application 103 are programs that are run while using a service of the OS 107. The software illustrated in FIG. 2 is stored in the HDD 17, is loaded to the main memory 13 during booting and is run by the CPU 11, whereby a predetermined function is implemented in the computer 10.

Figure 4A:
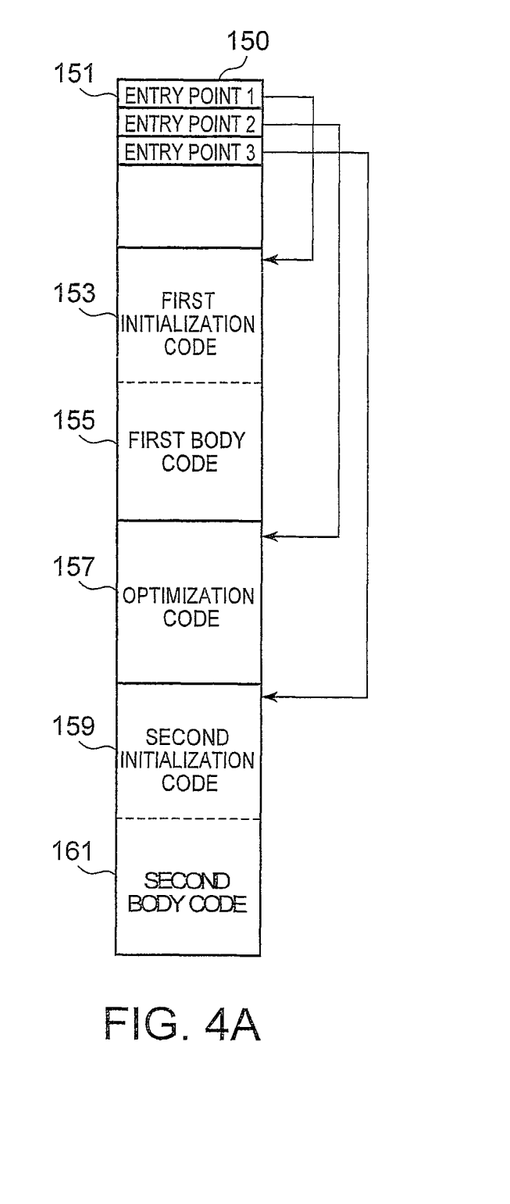
FIG. 4 describes the data structure of memory images of a divided-type program and a non-divided-type program.

The OS 107 includes a registry 109, an auto-run list 111, an API 113 and a kernel module 115. When a module is not a divided-type program 150 illustrated in FIG. 4, the OS 107 may be an existing OS such as Windows® or MAC®. However, since the data structure of the divided-type program 150 can be used as the module of the OS 107 as well, modification of the corresponding part is required for the existing OS.

The registry 109 is an internal database of the OS 107 to store configuration information of hardware of the computer 10, configuration information of software, security information, user information and the like. The configuration information of software contains configuration information of the OS 107, configuration information of an application a user installs and configuration information of a device driver installed in association with peripheral equipment. The auto-run list 111 stores information on names and the loading order of the boot programs. The auto-run list 111 includes a list published to a user so as to allow the user to register a boot program as well as a list for registration by a system only that is not published to a user.

The API 113 is an interface letting the divided-type applications 101 and 102 and the non divided-type application 103 use a service of the kernel module 115. The kernel module 115 is made up of multiple modules providing basic functions of the OS 107, such as a virtual memory, a device driver, process management and a file system. The optimization control program 117 sends, to the OS 107, an optimization event to run an optimization code 157 (see FIG. 4) of the divided-type application 101, 102 regularly. The device driver 119 is a special program to configure a hardware interface for the HDD 17 or to control data transfer between the HDD 17 and the OS 107.

[Process Transition]

Figure 3:
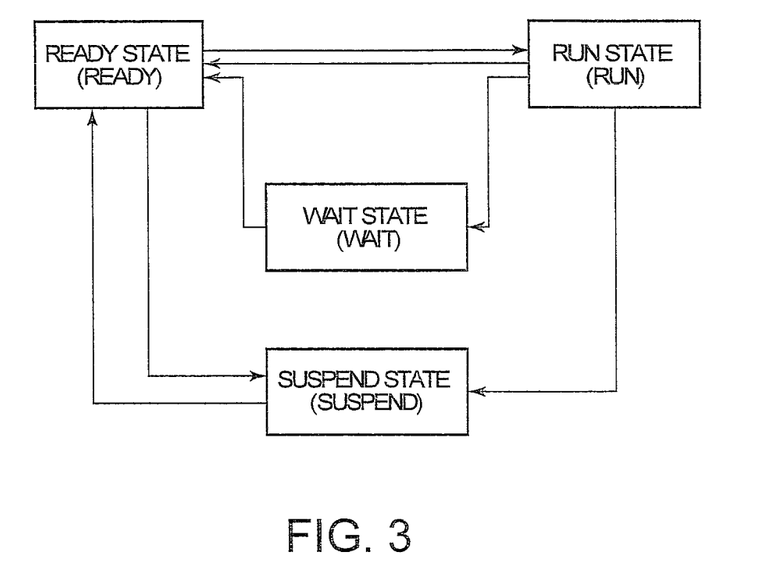
FIG. 3 illustrates a state where a process generated in a computer transits under the control of an operating system.

FIG. 3 illustrates a state where a process generated by the computer 10 transits under the control of the OS 107. The process is a data structure called a process control block (PCB), including a processor state, process priority, time slice information, a process ID, device information and the like. The run state (RUN) is a state where a process is currently run by the CPU 11, and after consuming the allocated time slice, the state shifts to a ready state (READY).

The ready state (READY) is a state where the process is ready and waits for running in the order of priority, where a process scheduler of the OS 107 dispatches PCBs registered in a ready queue to the CPU 11 in a predetermined order. The running wait state (WAIT) is a state where the process waits for running by calling a function stopping the running by itself until a certain condition such as I/O holds. The suspend state (SUSPEND) is a state where the process is forced to be in a wait state by another process.

In order for a certain process to make another process shift from a run state or a ready state to a suspend state or resumed from a suspend state to shift to a ready state, a specific API function can be called. At this time, when the OS does not provide an API function to directly suspend or resume a process, an API function covering all threads created by the process as a target of suspending and resuming can be called to implement suspending/resuming.

[Configuration of Divided-Type Program and Non-Divided-Type Program]

Figure 4B:
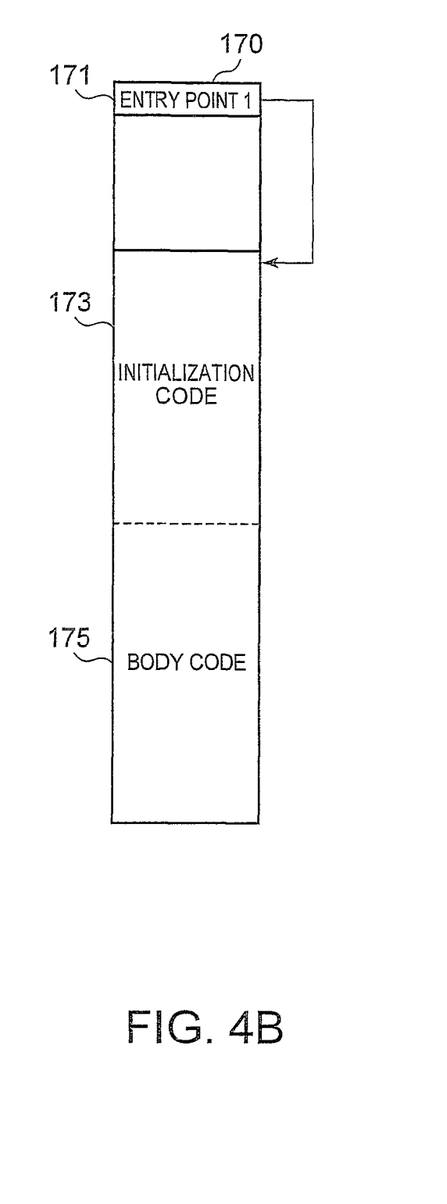

FIG. 4 describes the data structures of memory images when a divided-type program and a non-divided-type program are stored in the main memory. The divided-type program 150 corresponds to the data structures of the divided-type applications 101 and 102, and a non divided-type program 170 corresponds to the data structure of the non divided-type application 103. FIG. 4 illustrates the memory images linked with another object file and a library by a linker of the OS 107 during booting and expanded on a virtual address space of the main memory 13. The linker passes a memory image created in accordance with an instruction of an object code stored in the HDD 17 to a loader of the OS 107, whereby the memory image of FIG. 4 is stored in the main memory 13.

The memory image of the divided-type program 150 includes a section table 151, a first initialization code 153, a first body code 155, an optimization code 157, a second initialization code 159 and a second body code 161. The memory image of the non-divided-type program 170 includes a section table 171, an initialization code 173 and a body code 175.

In the divided-type program 150, the initialization code is divided into the first initialization code 153 and the second initialization code 159 having individual entry point 1 and 3, respectively. The non-divided-type program 170 is different from the divided-type program 150 in that the initialization code 173 has one entry point and is not divided. The data structure of the non-divided-type program 170 is well-known. The section table 151 of the divided-type program 150 includes entry points 1, 2 and 3 storing virtual addresses of sections storing codes and data.

The entry point 1 indicates the leading virtual address of the first initialization code 153, the entry point 2 indicates the leading address of the optimization code 157 and the entry point 3 indicates the leading address of the second initialization code 159. The section table 171 of the non divided-type program 170 includes an entry point 1. The entry point 1 indicates the leading address of the initialization code 173.

The OS 107 can run a predetermined code only by designating any one of the entry points of the section tables 151 and 171. Therefore, the arrangement of the first initialization code 153, the optimization code 157 and the second initialization code 159 on the main memory 13 is not limited to FIG. 4A. There is no need to divide blocks of the first body code 155 and the second body code 161, and both codes may be mixed in one block.

The function of the first body code 155 and the second initialization code 159 of the divided-type program 150 is the same as the function of the body code 175 of the non-divided-type program 170. The first initialization code 153 refers to the registry 109 or other databases to initialize the first body code 155 for running. The second initialization code 159 refers to the registry 109 or other databases to initialize the second body code 161 for running. The initialization code 173 refers to the registry 109 or other databases to initialize the body code 175 for running.

The first body code 155 and the second body code 161 are codes to implement a function as an object of a program. The first body code 155 and the second body code 161 create a process to be run during initialization, and further create a thread to run various functions. When a program is in an idle state, a run process transits to a suspend state or a wait state. When the scheduler of the OS 107 detects an event called by another process, the scheduler makes a run process in a suspend state or a wait process transit to a run state.

The divided-type program 150 is provided with a plurality of entry points for the initial codes, and such a data structure is effectively used during booting to shorten a boot time when the divided-type program 150 has dependence with another program. The first initialization code 153 is run during the booting to initialize the first body code 155. In order to shorten a boot time, the first initialization code 153 and the first body code 155 preferably are made up of codes that have to be run during the booting.

The first initialization code 153 may be configured so as to simply initialize the first body code 155 and to leave the final initialization including the complete initialization of the first body code 155 and the initialization of the second body code 161 to the second initialization code 159. In that case, the second initialization code 159 can initialize a part of the first body code 155 that is not initialized by the first initialization code 153. The second body code 161 may be made up of codes that can be initialized after completion of boot so as to allow the divided-type program 150 to implement a predetermined function.

The OS 107 can divide the first body code 155 of the divided-type program 150 from the second body code 161 for initialization, but cannot divide the body code 175 of the non divided-type program 170 for initialization. The first initialization code 153 and the second initialization code 159 are programs that may be run only once between loading and unloading, and can be deleted from the main memory 13 after running.

The first body code 155 is preferably made up of a code for a process having dependence with another program only. In order to secure the dependence, when the first body code 155 has an interface published to another program, the first initialization code 153 initializes the first body code 155. The first body code 155 further includes a code creating a process to load a succeeding program during booting. When many resources are consumed for running of the first initialization code 153 during booting, the boot time of the computer 10 will be lengthened. Therefore the first initialization code 153 is preferably created so as to consume minimum resources during running.

When the first initialization code 153 has to access the HDD 17 that is an only hardware resource incorporated in the computer 10 so as to initialize the first body code 155, the first initialization code 153 preferably performs such initialization so as to minimize the access to the HDD 17. For instance, when a large number of files have to be read from the HDD 17 to configure the first body code 155, the first initialization code 153 is preferably configured so that a minimum file for configuration is read without hindering the running of a program having dependence.

When the divided-type program 150 is a device driver, the first body code 155 may be a code configuring minimum hardware used by the divided-type program 150 itself or another program during booting. Services that the OS 107 provides are normally called by many applications. Accordingly, when the divided-type program 150 is an application, the first initialization code 153 may be a code configuring a service that the OS 107 provides such as port configuration.

In general, information configured in the registry 109 when a user uses the divided-type program 150 is used by the divided-type program 150 only. Such information is rarely required for running of another program. Accordingly, the first initialization code 153 can configure the first body code 155 so as not to use the information in the registry 109. In this case, a part of the first body code 155 that is not initialized by the first initialization code 153 can be initialized by the second initialization code 159 after completion of boot.

When the divided-type program 150 is of a type making the LCD 19 display an application window (hereinafter called a window) as a user interface, the first initialization code 153 may be configured so as to initialize the first body code 155 until the window can be displayed and enable reception of an activation event for complete activation through the window. The first body code 155 may create a process to run the second initialization code 159 and make the process transit to a suspend state, and make the process transit to a run state when the process is called by another program during loading. When running of the first initialization code 153 is completed, the first body code 155 creates a run process and partially activation of the divided-type program 150 is completed.

The second body code 161 may be made up of a code performing all processing not having dependence with another program. When the second initialization code 159 is run, the second body code 161 creates a run process and the divided-type program 150 is completely activated. When the divided-type program 150 is of an interactive type, the process shifts to an idle state after complete activation. At this time, the process running the first body code 155 also transits to a wait state or a suspend state. When the divided-type program 150 is a device driver, the second body code 161 may be a code configuring hardware used by a program operating after boot completion.

When the divided-type program 150 is an application, the second initialization code 159 may be a code configuring for the second body code 161 using user data that the divided-type program 150 has or a code configuring using information in the registry 109 configured while a user uses the divided-type program 150.

The divided-type program 150 is not created by simply providing an entry point during part of the conventional initialization code 173. A creator of the divided-type program 150 creates a code in the initialization code 173 that is to be run during booting as the first initialization code 153 and creates a code that may be run after boot completion as the second initialization code 159.

A program creator who knows the properties of the program the most can appropriately judge whether the conventional body code 175 is to be initialized with the first initialization code 153 or with the second initialization code 159. A trial to control run timing for initialization of the conventional body code 175 with another program will fail because such a code does not have separate entry points.

Additionally, unless coding of the first initialization code 153 and the second initialization code 159 is performed on the basis of the operation and the dependence during booting, a division method of the initialization code as in the present embodiment cannot be used for a program having dependence. Using the division method of the initialization code, when the OS 107 designates the entry point 1 at the same timing as in conventional one, the first initialization code 153 initializes the first body code 155 during booting to partially complete the boot, whereby a service can be provided in response to calling from another program during booting.

Then, when an activation event to use the second body code 161 is created after boot completion, the second initialization code 159 can perform final initialization of the first body code and initialization of the second body code 161. In this respect, the division method for the initialization code allows each boot program to shorten a boot time autonomously.

Since the information in the registry 109 used when the first initialization code is run is basic information for the operation of the computer 10, it is in general difficult to delete such information. Then, the optimization code 157 cleans up the information in the registry 109 used when the second initialization code 159 is run and user data for configuration that the divided-type program 150 has. When the divided-type program 150 is a Web browser, for example, the optimization code 157 may delete unnecessary information that the registry 109 or the Web browser itself has, such as Internet cache, browsing history or shortcuts without links.

The optimization code 157 enables a creator of the divided-type program 150 to set a criterion for judgment as to deletion of unnecessary information for the program in advance, and therefore much unnecessary information can be deleted with the optimization code 157 than in the case where information is deleted with a uniform criterion set by another program such as a registry cleaner. Further, a user is allowed to configure the optimization code 157 regarding optimum timing, temporal range and contents range of information to be deleted for the application.

For instance, a registry cleaner may delete browsing history of the Web browser back to one month ago. On the other hand, the optimization code 157 allows deletion of all browsing history for the divided-type program 150 to be at a predetermined time period. Since the amount of user data that the divided-type program 150 holds and has to be to read from the HDD 17 for initialization is reduced, a time occupying the HDD 17 during booting and a time slice that the CPU 11 provides to load the user data for running are reduced. As a result, a boot time can be shortened.

[Running Procedure of a Non-Divided-Type Application]

For comparison with the divided-type applications 101 and 102, loading and running procedure of the non divided-type application 103 is described below. When loading the non divided-type application 103, the OS 107 configures an entry point 1 including an image base and a RVA, and stores the initialization code 173 and the body code 175 at a section of a virtual address corresponding to the configured entry point 1. The image base referred to herein corresponds to an address as a reference when a program is loaded to a virtual address space.

The loaded memory image has a data structure, which can be displayed and confirmed using tdump.exe included in Borland C++ Compiler. After loading the non divided-type application 103 at a predetermined section, the OS 107 runs the application from the entry point 1. The initialization code 173 of the non divided-type application 103 initializes the body code 175. The initialized body code 175 creates a process to be run, and then activation of the non divided-type application 103 is completed.

When the non-divided-type application 103 is a program of an event driven type, a process to run the body code 175 once transits to a suspend state or a wait state after activation completion. Then, the non divided-type application 103 waits for a run event from a user through the input device 15 or a run event from the system. Receiving the run event, the OS 107 resumes the process to make the process transit to a ready state. When the non divided-type application 103 is a program to be run automatically without the need of a run event, the process does not shift to an idle state and the initialization code 173 and the body code 175 are successively run.

[Running Procedure of a Divided-Type Application]

Figure 5:
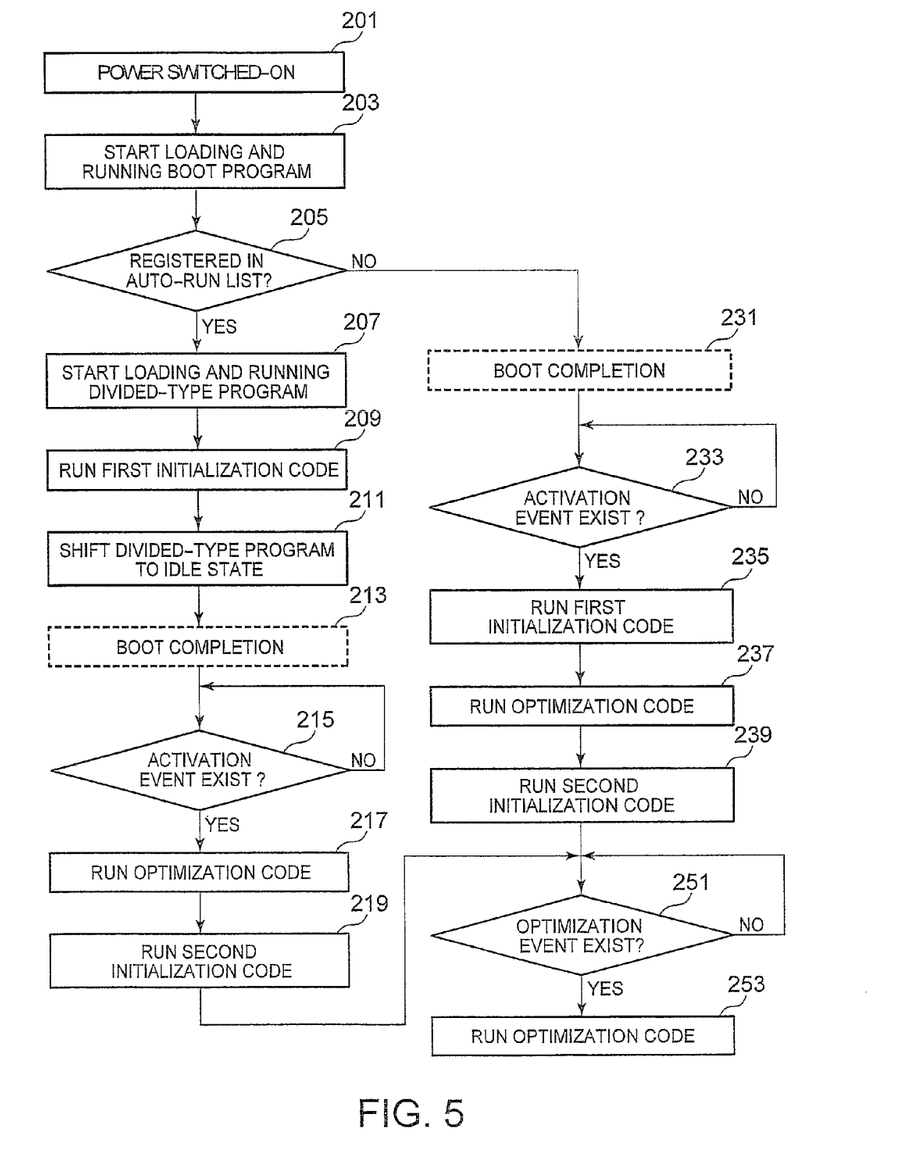
FIG. 5 is a flowchart of a method for running a divided-type program in a computer.

FIG. 5 is a flowchart of a method for executing the divided-type applications 101 and 102 in the computer 10. The divided-type application 101 is registered as a boot program in the auto-run list 111, and the divided-type application 102 is not registered. At block 201, the computer 10 is switched on and POST of the BIOS_ROM 21 is executed. Thereafter, control is shifted to codes of MBR and a boot sector stored in the HDD 17.

A boot routine here may be cold boot where boot is performed from a power-off state or warm boot where the entire POST or a part thereof is omitted. The boot routine, however, does not include resume using a hibernation state and resuming a memory image immediately before from the HDD 17 to the main memory 13. At block 203, a boot system code of the OS 107 is firstly run, and the registry 109 and the auto-run list 111 are loaded at the early stage.

Furthermore, a code processing boot of the kernel module 115 is loaded in a predetermined order. Since many modules of the OS 107 loaded at the early stage are required to provide complete services to other programs during booting to complete the boot, such modules do not have to be made up of the divided-type program 150. Starting the boot, at block 205, the OS 107 determines whether each boot program is registered or not in the auto-run list 111. For processing of the divided-type application 101 registered in the auto-run list 111, the procedure shifts to block 207, and for processing of the divided-type application 102 not registered, the procedure shifts to block 231.

At block 207, the divided-type application 101 registered in the auto-run list 111 is read from the HDD 17 successively and is run. The divided-type application 101 loaded and run creates a process to load the following boot program. Subsequently, the following boot program creates a process to load a further following boot program. The OS 107 loads a memory image of the divided-type application 101 in the units of sections to an address space of a virtual memory corresponding to the main memory 13.

An object code of the divided-type application 101 stored in the HDD 17 is coded to be formed with a memory image illustrated in FIG. 4. A linker of the OS 107 performs linking with another code and a library in accordance with an instruction of the object code to create the memory image of the divided-type application 101, and a loader stores the memory image in the main memory 13.

When the divided-type application 101 is loaded, the OS 107 configures entry points 1, 2 and 3 made up of an image base and a relative virtual address (RVA) at the section table 151. The OS 107 stores the first initialization code 153 and the first body code 155, the optimization code 157 and the second initialization code 159 and the second body code 161 at sections of virtual addresses corresponding to the configured entry points 1, 2 and 3, respectively.

After loading of the memory image is completed, at block 209, the OS 107 designates the entry point 1 and runs the first initialization code 153. After loading is completed, the first initialization code 153 automatically starts running in response to an instruction from the OS 107 to initialize the first body code 155. The initialized first body code 155 creates a run process. The OS 107 makes the run process transit to a suspend state or a wait state. When the divided-type application 101 is of a type displaying a window as a user interface, the window may be displayed at this time to receive an activation event to run the second initialization code 159. The first body code 155 may be configured to create a process to run the second initialization code 159 so that the process can run when another program calls the process during booting. At block 211, when running of the first initialization code 153 is completed, the divided-type application 101 completes partial activation and shifts to an idle state.

In the divided-type application 101 shifting to an idle state, the process to run the first body code 155 transits to a suspend state or a wait state. When another program calls the divided-type application 101 in an idle state, the OS 107 makes the process transit to a run state. Therefore, at the time when running of the first initialization code 153 is completed, the divided-type application 101 starts a service to be provided to another program during loading.

Another divided-type program 150 is loaded in a similar procedure until the first initialization code 153 runs. In the case of the non divided-type application 103, upon being loaded, the initialization code 173 and the body code 175 are run. On the other hand, in the case of the divided-type application 101, partial activation is simply completed with running of the first initialization code 153, whereby resources consumed in the CPU 11 and the HDD 17 are reduced and so a boot time can be shortened.

At block 213, activation of all boot programs is partially completed so that CPU usage is reduced, and then boot of the computer 10 is completed. At block 215, the OS 107 monitors an activation event to finally activate the divided-type application 101 where partial activation is completed. Herein, since the timing of boot completion does not agree with the timing of partial activation completion of individual programs, the procedure at block 215 may be prior to the boot completion.

The activation event is an event to run the second initialization code 159 of the divided-type application 101 that completes partial activation and shifts to an idle state before complete activation. When the divided-type application 101 displays the window to receive an input instruction from a user at block 209, the activation event may be an event indicating a state where the window changes from background to foreground or an input event from the input device 15. Other examples of the activation event include an activation event at predetermined timing by the OS 107 and an activation event at boot completion timing of the computer 10. The latter activation event may be used also when the divided-type application 101 runs without waiting for an input from a user.

At block 217, the OS 107 receiving the activation event designates the entry point 2 to run the optimization code 157. The optimization code 157 deletes unnecessary information from the registry 109 and configuration data that the divided-type application 101 has for cleanup. Note here that the optimization code 157 does not have to run always before the second initialization code 159 runs. Running of the optimization code 157 at this stage can securely reduce resources used during running of the second initialization code 159. When the optimization code 157 does not run during booting, the entry point 2 is not provided, and the optimization code 157 may be incorporated in the second body code 161.

At block 219, the optimization code 157 finally designates the entry point 3 to run the second initialization code 159. The second initialization code 159 refers to the registry 109 subjected to cleanup and performs initialization of the second body code 161 and necessary initialization of the first body code 155. The OS 107 makes a process for run that the initialized second body code 161 creates transit to a suspend state or a wait state. The OS 107 further makes a process for run that the additionally initialized first body code 155 creates transit to a suspend state or a wait state.

In this state, activation of the divided-type application 101 is completely completed and the application shifts to a normal run state. When the application is of a type displaying a window on the LCD 19 to receive an input from a user, the window may be displayed at this stage. When another program calls the divided-type application 101, the OS 107 makes the process in a suspend state or a wait state transit to a run state. When the second body code 161 runs, the second body code 161 can create a process to run the optimization code 157 for which the entry point 2 is designated. At block 251, the OS 107 monitors whether the optimization control program 117 creates an optimization event or not.

When receiving the optimization event, the OS 107 notifies the divided-type application 101 of a specific group or all divided-type applications 101 of the optimization event. The optimization code 157 of the divided-type application 101 receiving the optimization event deletes predetermined information from the registry 109 and user data concerning configuration. The optimization code 157 can run at both of or either one of block 217 and block 253. The optimization control program 117 can generate the optimization event at regular timing after boot completion of the computer 10 or at power-off timing.

The divided-type application 102 not registered in the auto-run list 111 is not run during booting and is loaded by an activation event generated after boot completion for running. In this way, boot can be completed without registering the divided-type application 102 in the auto-run list 111, which means that the divided-type application 102 does not have dependence, and therefore the divided-type application 102 in principle may be configured as the non divided-type program 170.

The divided-type application 102 not having dependence can be activated after boot completion. However, when the divided-type application 102 has dependence in the future, the divided-type application 102 may be a boot program. At block 231, boot of the computer 10 is completed. At block 233, the OS 107 monitors an activation event for the divided-type application 102. Since the divided-type application 102 is in a not-run state at this time, an activation event is required to activate the divided-type application 102 completely. The activation event can be created by making an access to a file system of the OS 107 with the input device 15.

At block 235, when the divided-type application 102 is not loaded at this time, the OS 107 creates a process to read the divided-type application 102 from the HDD 17 in accordance with the activation event. The OS 107 detecting the activation event loads the divided-type application 102 to the main memory 13. After loading of a memory image is completed, the OS 107 designates the entry point 1 to run the first initialization code 153.

When the divided-type application 102 has been already loaded, the OS 107 may run the first initialization code 153 from the entry point 1 in accordance with the activation event. When the first initialization code 153 initializes the first body code 155, the first body code 155 creates a run process and notifies the OS 107 of the run process. Subsequently, at block 237, the OS 107 designates the entry point 2 to run the optimization code 157. After running of the optimization code 157 is completed, at block 239, the OS 107 designates the entry point 3 to run the second initialization code 159. In this way, the OS 107 continuously runs the first initialization code 153, the optimization code 157 and the second initialization code 159 of the divided-type application 102 not registered in the auto-run list 111 after boot completion without "sandwiching" an idle state therebetween.

The method of FIG. 5 describes the running procedure of the divided-type applications 101 and 102. In the present invention, however, the OS 107 may load and run the non-divided-type application 103 in parallel with the divided-type applications 101 and 102 during booting. The data structure of the divided-type program 150 can be used for an application and a service program of an OS that are not required to undergo initialization of all body codes before boot completion.

A device driver may be divided into a code that has to initialize a register during booting for operation of another program and a code to initialize a register that is evidently used after boot completion. Such a device driver also may be configured as in the divided-type program 150, whereby a boot time can be shortened. A program of a type that can run on demand after boot completion can be removed from the divided-type program 150.

[Running Order of Programs]

Figure 6:
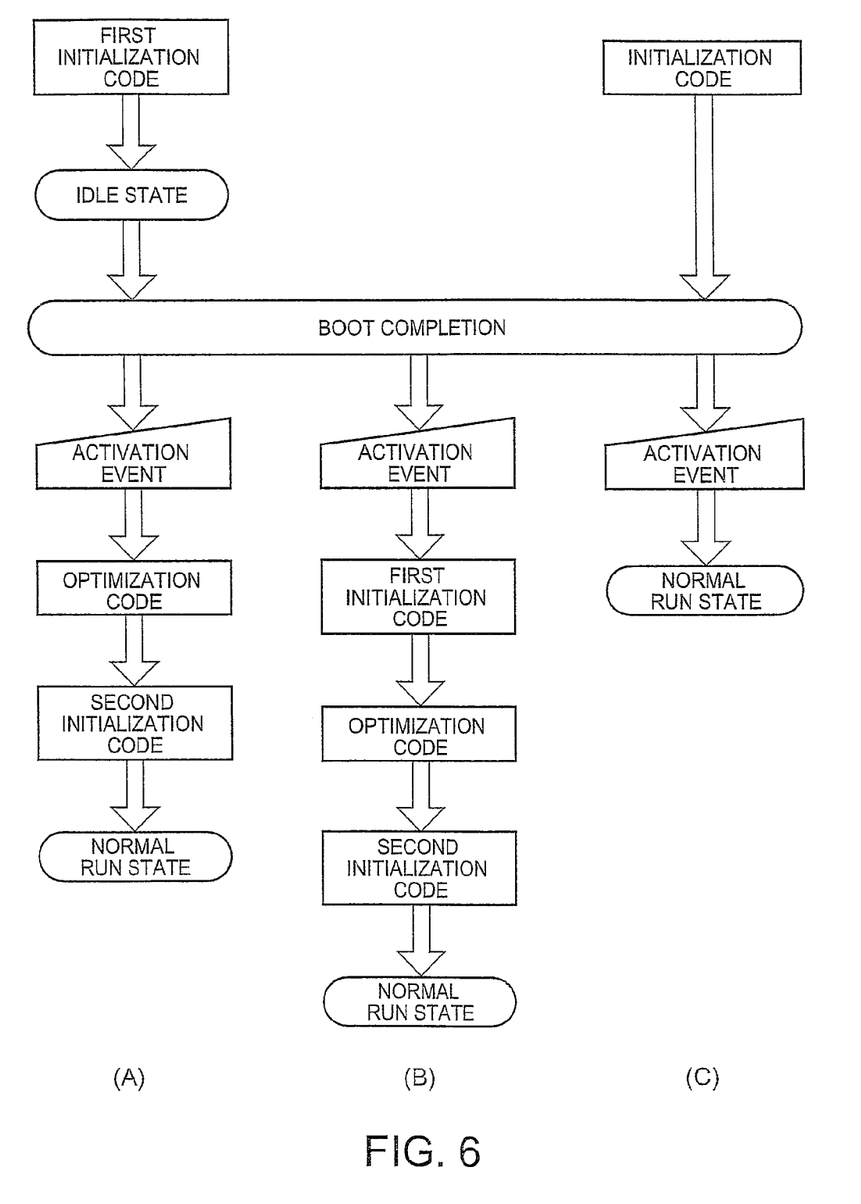
FIG. 6 describes the running order of codes making up a divided-type program and a non-divided-type program.

FIGS. 6A-6C describe the running order of codes making up the divided-type applications 101 and 102 and the non-divided-type application 103 performed in accordance with the method of FIG. 5. FIG. 6A illustrates the divided-type application 101, FIG. 6B illustrates the divided-type application 102, and FIG. 6C illustrates the non divided-type program 170 registered in the auto-nm list 111. In the divided-type application 101, the first initialization code 153 only runs during booting, so that consumed resources can be reduced and influences on delay of the boot time are small even when the application is activated in parallel with the OS 107 and other programs.

The divided-type application 102 is not a boot program, which never affects the delay of the boot time. The divided-type application 102 may be loaded during booting because influences on the delay of a boot time are small unless the divided-type application 102 is run. In the case of the non divided-type program 170, the entire initialization boot runs before boot completion, thus consuming many resources and greatly affecting the delay of a boot time.

As has been described, the present invention provides an improved method for booting up a computer in a relative short time.

Those skilled in the art will appreciate that the mechanisms of the present invention are capable of being distributed as a computer program product in a variety of computer-readable storage medium such as compact discs, digital versatile discs, etc.

While the invention has been particularly shown and described with reference to a preferred embodiment, it will be understood by those skilled in the art that various changes in form and detail may be made therein without departing from the spirit and scope of the invention.

What is claimed is:
1. A method comprising:
  executing first initialization code of a first divided-type application program during booting of said computer, and shifting said first initialization code of said first divided-type application program to an idle state before a boot completion of said computer;

in response to first activation event after said boot completion, executing second initialization code of said first divided-type application program; and in response to a second activation event after said boot completion, executing first and second initialization code of a second divided-type application program.

2. The method of claim 1, further comprising
executing initialization code of a non divided-type application program during said booting of said computer;
in response to an activation event after said boot completion of said computer, executing said non divided-type application program.

3. The method of claim 1, wherein said first initialization code of said first divided-type application program includes a code for performing only initialization required for said boot completion of said computer, and said second initialization code of said first divided-type application program includes a code for completing initialization of said first divided-type application program.

4. The method of claim 1, wherein said first initialization code of said first divided-type application program initializes a body code having dependence with another program about running order during booting process.

5. The method of claim 1, wherein each of said first initialization code and said second initialization code of said first divided-type application program has a different entry point of execution.

6. The method of claim 1, further comprising executing optimization code in response to said first activation event and prior to running of said second initialization code of said first divided-type application program, said optimization code being configured to delete predetermined information from a registry of an operating system.

7. The method of claim 1, further comprising executing optimization code after completion of running of said second initialization code of said first divided-type application program, said optimization code being configured to delete predetermined information from a registry of an operating system.

8. The method of claim 1, wherein each of said first and second activation events is generated at any one of timings including timing when a window of said program changes from background to foreground, timing when input is performed with an input device, and timing of a regular event generated by a system.

9. The method of claim 1, further comprising:
determining whether or not said first divided-type application program is registered in an auto-run list; and
in a determination that said first divided-type application program is not registered in said auto-run list, executing said first initialization code and said second initialization code of said first divided-type application program after said boot completion of said computer.

10. The method of claim 1, further comprising:
loading said first initialization code of said first divided-type application program in a first location of a system memory;
loading said second initialization code of said first divided-type application program in a second location of said system memory.

11. The method of claim 1, further comprising executing said first divided-type application program after said execution of said second initialization code of said first divided-type application program.

12. A computer readable device having a boot program that is activated automatically in a computer starting booting process, said computer readable device comprising:
program code for executing first initialization code of a first divided-type application program during booting of said computer, and shifting said first initialization code of said first divided-type application program to an idle state before a boot completion of said computer;
program code for, in response to first activation event after said boot completion, executing second initialization code of said first divided-type application program; and
program code for, in response to a second activation event after said boot completion, executing first and second initialization code of a second divided-type application program.

13. The computer readable device of claim 12, further comprising
program code for executing initialization code of a non divided-type application program during said booting of said computer;
program code for, in response to an activation event after said boot completion of said computer, executing said non divided-type application program.

14. The computer readable device of claim 12, wherein said first initialization code of said first divided-type application program includes program code for performing only initialization required for said boot completion of said computer, and said second initialization code of said first divided-type application program includes code for completing initialization of said first divided-type application program.

15. A computer comprising:
a disk drive for storing a boot program, a first divided-type application program and a second divided-type application program, wherein each of said first and second divided-type application programs includes a first initialization code and a second initialization code;
a main memory storing a memory images of said boot program, said first divided-type application program and said second divided-type application program; and
a processor for executing said first initialization code of said first divided-type application program during booting of said computer, for shifting said first initialization code of said first divided-type application program to an idle state before a boot completion of said computer, for executing said second initialization code of said first divided-type application program in response to a first activation event after said boot completion, and for executing said first and second initialization code of a second divided-type application program in response to second activation event after said boot completion.

16. The computer of claim 15, wherein said processor further
executes initialization code of a non divided-type application program during said booting of said computer; and
in response to an activation event after said boot completion of said computer, executes said non divided-type application program.

* * * * *